United States Patent
Shahid (10) Patent No.: US 6,168,317 B1
(45) Date of Patent: Jan. 2, 2001

(54) ALIGNMENT ADAPTER FOR AN OPTICAL CONNECTOR AND METHOD FOR MAKING SAME

(75) Inventor: Muhammed A. Shahid, Snellville, GA (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/070,341

(22) Filed: Apr. 30, 1998

(51) Int. Cl.⁷ .................................................. G02B 6/38
(52) U.S. Cl. ............................................. 385/71; 385/59
(58) Field of Search ................................. 385/71, 59, 70, 385/58

(56) References Cited

U.S. PATENT DOCUMENTS

| | | | |
|---|---|---|---|
| 4,818,058 | 4/1989 | Bonanni . | |
| 5,082,346 | * 1/1992 | Myers | 385/54 |
| 5,287,426 | 2/1994 | Shahid | 385/85 |
| 5,388,174 | 2/1995 | Roll et al. | 385/80 |
| 5,446,810 | * 8/1995 | Watanabe et al. | 385/22 |
| 5,603,870 | 2/1997 | Roll et al. | 264/1.25 |
| 5,613,024 | 3/1997 | Shahid | 385/52 |
| 5,620,634 | 4/1997 | Shahid | 264/1.25 |
| 5,632,908 | 5/1997 | Shahid | 216/2 |
| 5,639,387 | 6/1997 | Shahid | 216/39 |
| 5,867,621 | * 2/1999 | Luther et al. | 385/59 |

FOREIGN PATENT DOCUMENTS 57-205704A * 12/1982 (JP) .

OTHER PUBLICATIONS

*Multifiber–ferrule Ribbon Cable Connector Shrinks Installation Costs*, Roger E. Weiss, Lightwave, Oct. 1996.

* cited by examiner

Primary Examiner—Rodney Bovernick
Assistant Examiner—Michael J. Stahl (57) ABSTRACT

An alignment adapter for use with a multi-fiber, optical connector that is in the form of a substantially planar slab having a central opening for receiving a connector therethrough. The slab includes a pair of alignment apertures on opposing sides of the central opening that are positioned in a defined spatial relationship with the fibers held in the multi-fiber connector. According to an aspect of the invention, the alignment adapter includes a pair of alignment rods held in the alignment apertures that are used to convert an optical connector into a male type connector. According to another aspect of the present invention, a connector is disclosed having a plurality of channels for holding optical fibers and a pair of alignment apertures positioned adjacent to the fiber holding channels in a defined spatial relationship. When the connector is received through the central opening of the alignment adapter, the alignment apertures of the alignment adapter precisely register with the alignment apertures formed in the connector. The precision with which the alignment apertures of the alignment adapter register with the alignment apertures in the connector is a result of a process that involves etching a monocrystalline material, typically silicon, to form a plurality of parallel fiber grooves and a pair of alignment grooves. Using this etched material as a template, an inverse replica is created that is separated into two parts. One part is used as a pattern for making the alignment adapter members, the other part is used as a pattern for making the connector members.

23 Claims, 8 Drawing Sheets

ALIGNMENT ADAPTER FOR AN OPTICAL CONNECTOR AND METHOD FOR MAKING SAME

BACKGROUND OF THE INVENTION

The present invention relates generally to the field of fiber optical connectors and, more particularly, to an adapter and method of making same for ensuring a precise alignment between multi-fiber connectors.

With the demand for high speed, multi-media services constantly increasing, fiber optic technology is gaining increased attention as communication service providers design their networks to carry high bandwidth signals. Fiber optic technology is so attractive because of the tremendous bandwidth capability of light transmission. Light in the visible and near visible spectrum has characteristic frequencies exceeding hundreds of gigahertz (GHz) allowing information transmission at rates unattainable by traditional, twisted-pair wire technology.

In addition to their high bandwidth, optical fibers offer several advantages over copper-based transmission media: fiber optic media have very low loss characteristics, particularly when compared to metallic media. Fiber optic cables are essentially immune to electromagnetic interference and do not generate any electromagnetic fields to interfere with other equipment. Inasmuch as fiber optic cables are nonconducting, they do not load electrical equipment— instead, the cables act as an optoisolator. Furthermore, fiber optic cables are small and lightweight and can be installed where twisted-pair copper wires will not fit. Lastly, optical fiber, despite its significant performance advantage, is price competitive with high-end twisted pair cable.

While these advantages are impressive, fiber optic technology does have its drawbacks. For example, optical fiber connectors are much more complex than copper wire connectors because the fibers must be connected end to end with such precision that the fiber cores align within a few microns, and, in some cases, within a fraction of a micron. The precision required in connecting optical fibers together precludes the practice of bundling large numbers of fibers in a single cable as is frequently practiced with copper wires. Alternatively, fibers are generally organized in a precise, spatial relationship such as in a ribbon cable in which fibers are organized and molded adjacent to one another in a plastic ribbon. The connectors used to interconnect the ribbons to one another are generally made from metal, silicon, or plastic members and have high precision grooves or holes etched therein for receiving the individual fibers. In some instances, fibers are placed alongside one another in a grooved bottom member and a second, complementary top member is placed over the bottom member confining the fibers therebetween. The two member halves are generally secured with clamps and/or an adhesive.

To establish an optical connection, it is critical that the fiber array from one connector precisely align with a fiber array from another connector. While various connector designs have been developed to facilitate fiber alignment, there nevertheless remains room for improvement in the art. Thus, what is sought is an improved alignment mechanism for multi-fiber connectors.

SUMMARY OF THE INVENTION

Certain objects, advantages and novel features of the invention will be set forth in the description that follows and will become apparent to those skilled in the art upon examination of the following or may be learned with the practice of the invention.

The present invention is generally directed to an alignment adapter for use with an optical connector and more particularly to a multi-fiber optical connector. The alignment adapter in a preferred embodiment comprises a substantially planar slab having a central opening for receiving a front end of a connector therethrough. The slab includes a pair of alignment apertures on opposing sides of the central opening that are positioned in a defined spatial relationship with the fibers held in the multi-fiber connector. According to an aspect of the invention, the alignment adapter includes a pair of alignment rods held in the alignment apertures that are used to convert an optical connector into a male type connector. According to another aspect of the present invention, a connector is disclosed having a plurality of channels for holding optical fibers and a pair of alignment apertures positioned adjacent to the fiber holding channels in a defined spatial relationship. When the connector is received through the central opening of the alignment adapter, the alignment apertures of the alignment adapter precisely register with the alignment apertures formed in the connector. As a result, the alignment rods exert virtually no lateral pressure on the connector, which is a frequent problem in certain types of prior art optical connectors. According to still another aspect of the present invention, the connector includes a nose region that is received through the central opening in the alignment adapter and extends the fiber channels forward of the apertures formed in the connector. Advantageously, the fiber ends can be polished at the end face of the connector without causing debris to become lodged in the connector alignment apertures that could result in misalignment.

The precision with which the alignment apertures of the alignment adapter register with the alignment apertures in the connector is a result of the unique method by which these components are manufactured. The process involves etching a monocrystalline material, typically silicon, to form a plurality of parallel fiber grooves and a pair of alignment grooves with the fiber grooves being interposed between the alignment grooves. Those skilled in the art will appreciate that these materials can be etched with a very high degree of precision. Using this etched material as a template, an inverse replica is created that is separated into two parts. One part is used as a pattern for making the alignment adapter members, the other part is used as a pattern for making the connector members. Thus, because both the alignment adapter and the connector are derived from the same precisely etched template, the apertures in the two components align with the same degree of precision.

Because the etched template can be designed to conform precisely to any desired prior art connector standard, an assembly comprising an alignment adapter and connector according to the present invention and configured as a male type connector can be used to couple to similar or prior art connectors with great precision.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Figure 1A:
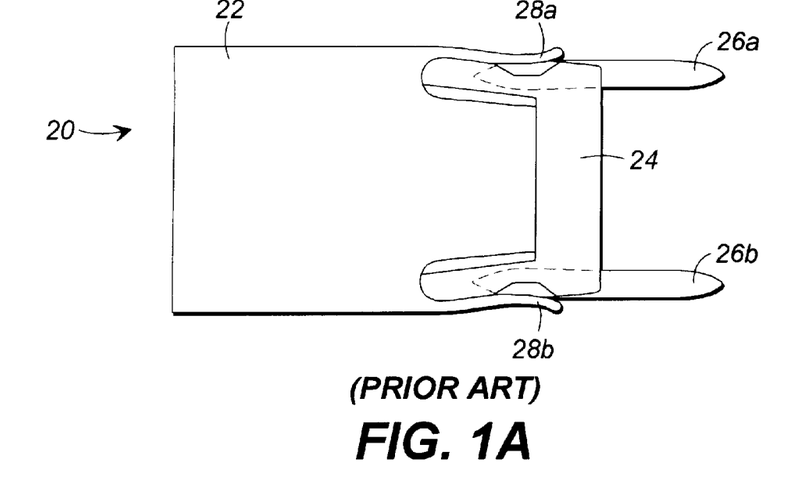
FIG. 1A is a plan view of a prior art multi-fiber connector.
Figure 1B:
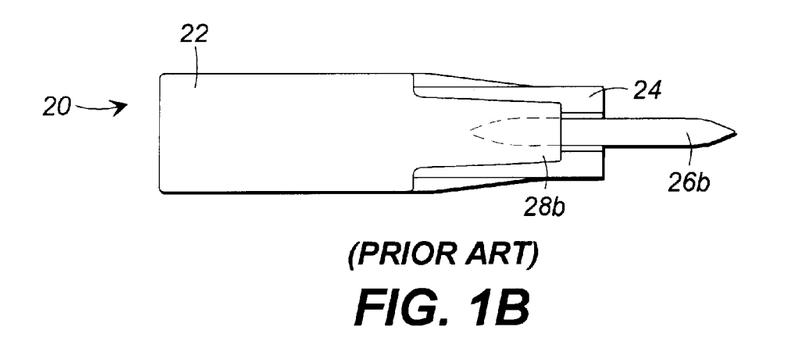
FIG. 1B is an elevation view depicting one side of the connector of FIG. 1A.

Referring now to FIGS. 1A and 1B, a prior art MACII® or MINIMAC® multi-fiber connector 20 is shown to comprise a housing 22 typically made from a metallic or plastic material and confining a multi-fiber connector 24 and a pair of alignment pins 26a,b therein. Pins 26a,b are held tight against connector 24 by arms 28a,b and are used to mate connector 24 to another female configured connector such that the individual fiber ends are precisely aligned. As illustrated best in FIGS. 1A and 1C, arms 28a,b are designed to cradle pins 26a,b. Because of their resilient nature, arms 28a,b expand to receive and then compress pins 26a,b into v-shaped alignment grooves 30a,b formed in connector 24.

Figure 1C:
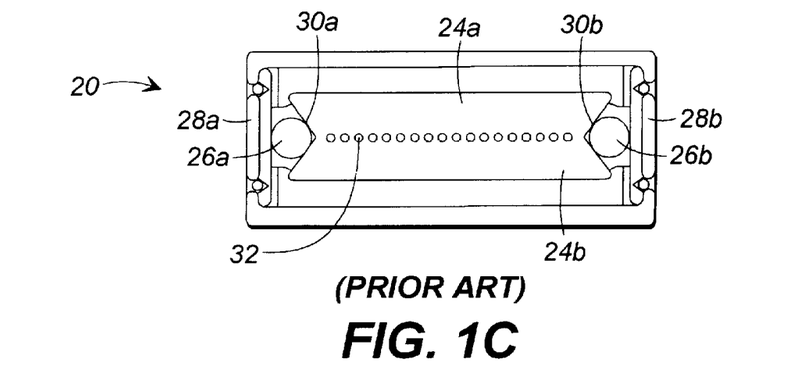
FIG. 1C is an elevation view depicting the interface end of the connector of FIG. 1A.

This architecture has its drawbacks, however. Connector 24 is constructed from two complementary members 24a,b, typically made from silicon, and having precision engineered grooves etched therein that form individual fiber passages 32 when members 24a,b are assembled as shown in FIG. 1C. Members 24a,b engage one another in a mechanical relationship, which is secured using an adhesive. Unfortunately, the pressure exerted by arms 28a,b on alignment grooves 30a,b through pins 26a,b can weaken the bond between members 24a,b over time potentially requiring the eventual replacement or repair of connector 24.

Figure 2:
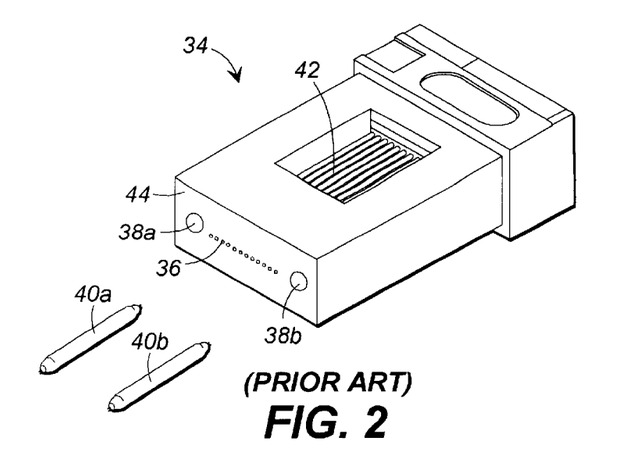
FIG. 2 is a perspective view of another prior art multi-fiber connector.

FIG. 2 depicts a second prior art MTP/0® connector 34, which is constructed from a transfer molded block of plastic material into which precision holes or passages 36, 38a,b are formed to receive individual fibers and alignment pins respectively. In connector 34, however, the alignment passages 38a,b for receiving alignment pins 40a,b are engineered into the body of connector 34 using similar etching techniques used to form fiber passages 36. While this design overcomes the problem of weakening the connector structure over time, as discussed in the foregoing, it nevertheless suffers from a different drawback. Once connector 34 is assembled and the individual fibers 42 are brought out to the face 44 of connector 34 through passages 36, it is customary to polish the fiber ends at face 44 to establish a clear optical connection when face 44 abuts the face of another connector. During the polishing process, however, small debris can become lodged in alignment passages 38a,b, which can be very difficult to clean out. Because alignment of the fiber ends must be maintained within a few microns, even microscopic debris in alignment passages 38a,b can result in misalignment and impair the quality of the communication channels carried by the fibers.

Figure 3A:
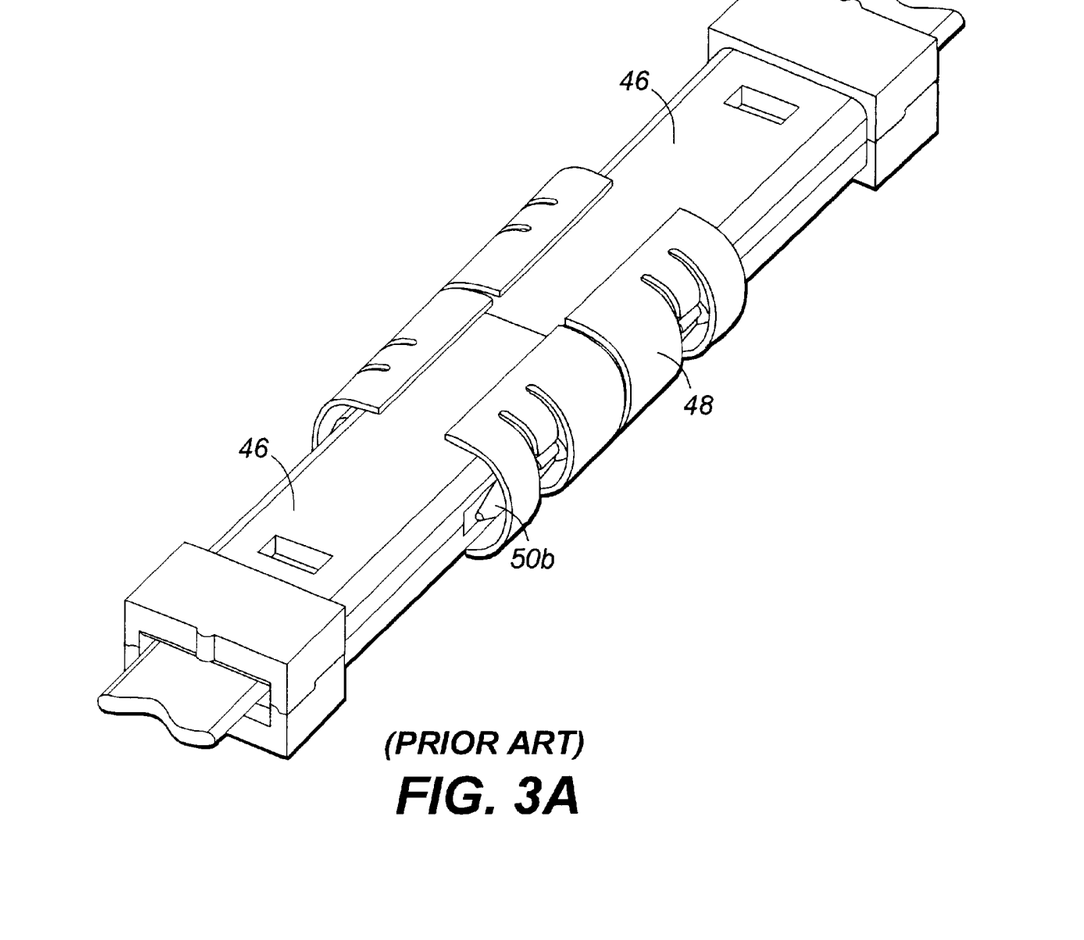
FIG. 3A is a perspective view of a prior art multi-fiber connection using still another set of prior art connectors.
Figure 3B:
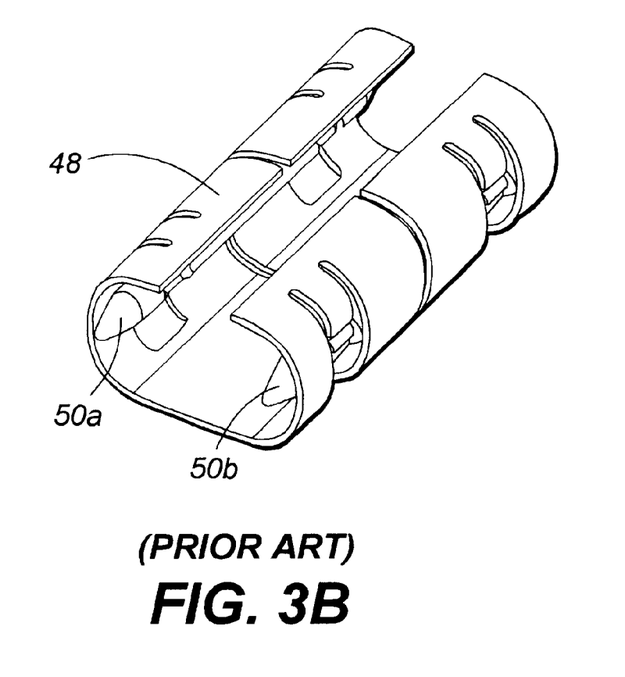
FIG. 3B is a perspective view of an alignment spring used with the connectors of FIG. 3A.
Figure 3C:
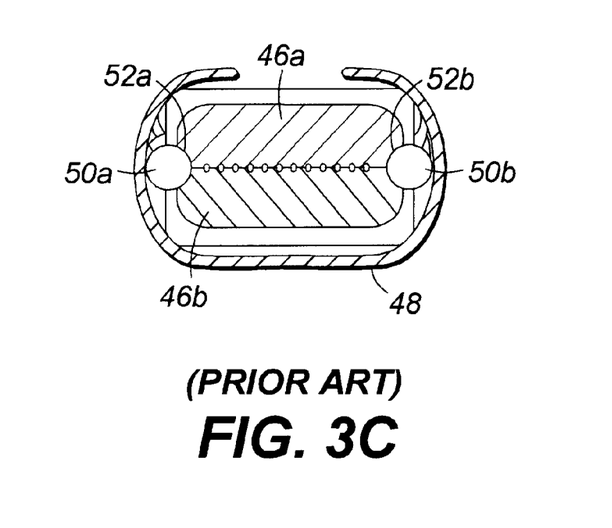
FIG. 3C is an elevation view depicting the interface end of one of the connectors of FIG. 3A.

A third prior art MP® connector system is illustrated in FIGS. 3A–3C. As shown in FIG. 3A, a connection is made between identical connectors 46 through coupling clip 48. Shown best in FIGS. 3B and 3C, coupling clip 48 holds alignment pins 50a,b, which are received by alignment grooves 52a,b in both connectors 46 to accurately align the fiber ends. Connector 46, however, suffers from the same drawback as connector 20 discussed hereinbefore. That is, coupling clip 48 exerts pressure on alignment grooves 52a,b through alignment pins 50a,b that tends to cause members 46a,b comprising connector 46 to separate over time.

Figure 4:
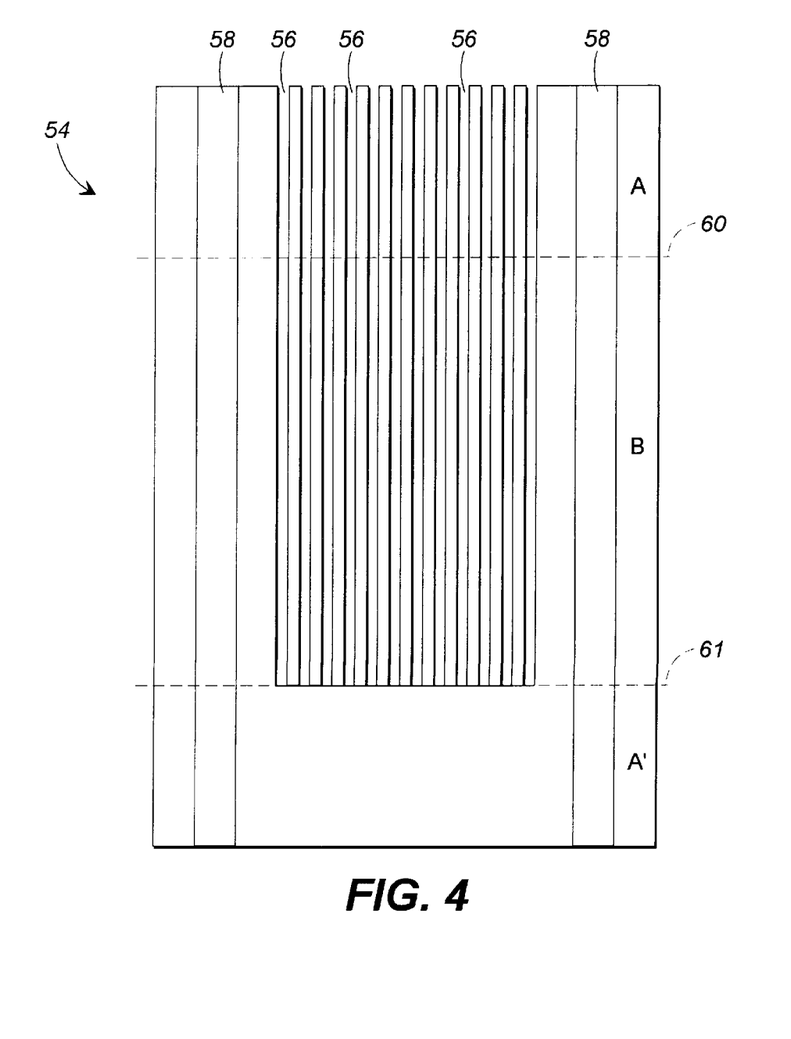
FIG. 4 is a plan view of an electro-plated inverse replica template for generating production molds for the alignment adapter and multi-fiber connector according to the present invention.

An alignment adapter that overcomes the aforementioned disadvantages and can be used to interconnect similar and dissimilar connectors is described hereafter. Referring now to FIG. 4, an inverse replica 54 of a precision etched silicon template is shown. Monocrystalline materials, such as silicon, are commonly used in manufacturing multi-fiber connectors because they are particularly suited to the formation of v-grooves for aligning the individual fibers through photolithographic masking and precision etching. Etching of these materials inherently progresses along crystallographic planes, which permits features to be formed with precise predictability. U.S. Pat. Nos: 5,639,387 to Shahid, 5,632,908 to Shahid, 4,998,796 to Bonanni et al., and 4,818,058 to Bonanni describe the etching process in greater detail and are each incorporated herein by reference. Replica 54 is typically made by electroplating the template with nickel or another material of suitable hardness. Replica 54 is then separated from the template and used to define fiber grooves 56 and alignment grooves 58 for a connector. Specifically, a defined spatial relationship is established between fiber grooves 56 and alignment grooves 58 that ensures a consistent and precise alignment of components derived from replica 54. The number of fiber grooves 56 and the lateral positioning of alignment grooves 58 are design parameters typically chosen to correspond to another connector standard such as the MACII, MTP/0, or the MP connectors discussed hereinbefore. Other techniques for forming replica 54 can be used with equal success such as chemical vapor deposition or electroless plating.

As shown in FIG. 4, replica 54 is then cut along either line 60 or 61 into two parts A and B or A' and B where B includes the non-severed region either A or A'. Part A or A' is used as a pattern for making an alignment adapter according to the present invention. For example, part A or A' can be machined and used as an insert in a mold from which an alignment adapter can be produced by injection molding. Similarly, part B is used as a pattern for making a connector. Following the same example, part B is machined and used as an insert into another cavity of the same or different mold to produce connector member components. It is customary to oversize the etched silicon template, and, as a result, replica 54, to account for some amount of shrinkage in the molded plastic components. The conversion of replica 54 into inserts for use in injection molding is taught in U.S. Pat. No. 5,388,174 to Roll et al. and U.S. Pat. No. 5,603,870 to Roll et al., both of which are incorporated herein by reference. Alternative manufacturing techniques such as compression molding or die stamping can also be used to produce the adapter and connector components. All of these manufacturing techniques enjoy a significant cost advantage over making the parts from silicon or another monocrystalline material through photolithographic masking and etching.

It will be understood by those skilled in the art that instead of separating replica 54 into two parts—one part to manufacture the alignment adapter and another part to manufacture the connector—the original monocrystalline (e.g., silicon) template could likewise be separated into two parts from which two replicas could be generated to produce the alignment adapter and connector respectively.

Figure 5:
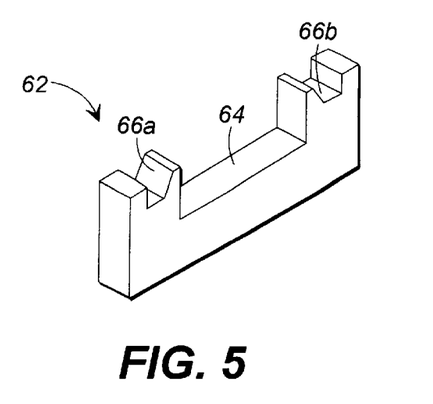
FIG. 5 is a perspective view of one alignment adapter member based on the template of FIG. 4 and used in assembling an adapter according to the present invention.

Based on the insert generated from replica 54 part A or A', one member 62 comprising the alignment adapter of present invention is molded as illustrated in FIG. 5. Note that the array of fiber grooves 56 from replica 54 part A are irrelevant to the design of the alignment adapter and are therefore machined out when the mold insert is made. Thus, if it is desirable to use the entire length of fiber grooves 56 in replica 54 in making the connector components, replica 54 should be cut along line 61. Otherwise, it may be convenient to use part A both to produce the alignment adapter parts and to reduce the length of fiber grooves 56 in part B to conform to the proper length for the connector. Accordingly, either part A or A' is machined to generate adapter members that conform to the shape of a connector on which they will be used, which is depicted as central region 64 in FIG. 5. Of critical importance, however, are alignment grooves 66a,b, which are molded based on the design dimensions defined by replica 54. Advantageously, because adapter member 62 is molded from the same replica that is used to mold the connector members, alignment grooves 66a,b are guaranteed to precisely register with corresponding alignment grooves in the connector. Moreover, alignment grooves 66a,b will also register precisely with the alignment grooves of alternative types of connectors depending on the lateral spacing chosen when etching the silicon template from which replica 54 is created.

Figure 6A:
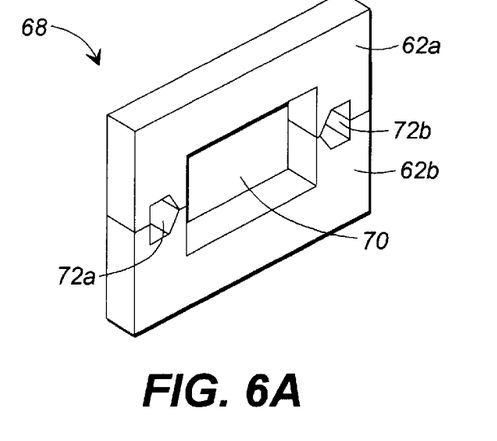
FIG. 6A is a perspective view of an assembled alignment adapter comprising two complementary members of the type shown in FIG. 5 and having pentagonal shaped alignment apertures.

Two identical adapter members 62 can be joined to one another using an adhesive, a plastic weld, or other suitable securing means to create alignment adapter 68, which is illustrated in FIG. 6A. Once assembled, alignment adapter 68 assumes the shape of a substantially planar slab with an aperture 70 formed in the center for positioning the adapter over the end of a connector. Alignment apertures 72a,b are formed on either side of aperture 70 from alignment grooves 66a,b on the two adapter members 62a,b. Alignment apertures 72a,b are shown to take on a pentagonal shape in FIG. 6; however, any desired shape can be used that is designed to receive and hold alignment pins or rods therethrough. For example, FIG. 6B illustrates an embodiment of alignment adapter 68 having hexagonal shaped alignment apertures 72a,b.

Figure 7:
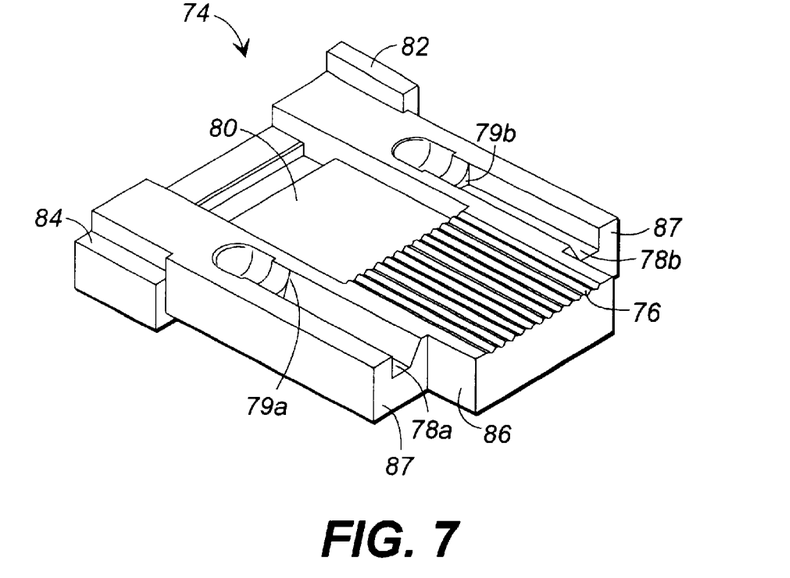
FIG. 7 is a perspective view of one connector member based on the template of FIG. 4 and used in assembling a multi-fiber connector according to the present invention.

The insert generated from replica 54 part B is fitted into another cavity of the same mold used to produce adapter member 62 or another mold for producing connector member 74 shown in FIG. 7. Fiber grooves 56 and alignment grooves 58 in replica 54 part B are used to define fiber grooves 76 and alignment grooves 78a,b in connector member 74. Alignment grooves 78a,b include shoulders 79a,b respectively for engaging alignment pins or rods adapted to mate therewith. Connector member 74 further includes ribbon cable reception region 80, which holds the ribbon cable while the individual fibers are broken out and secured in fiber grooves 76. Tab 82 and flange 84 are used to define a mating relationship between connector members 74. Finally, connector member 74 is shown to include a nose region 86, which depends from shoulders 87 and extends fiber grooves 76 beyond alignment grooves 78a,b. As will be discussed and illustrated hereafter, nose region 86 is used for engaging alignment adapter 68.

Figure 8A:
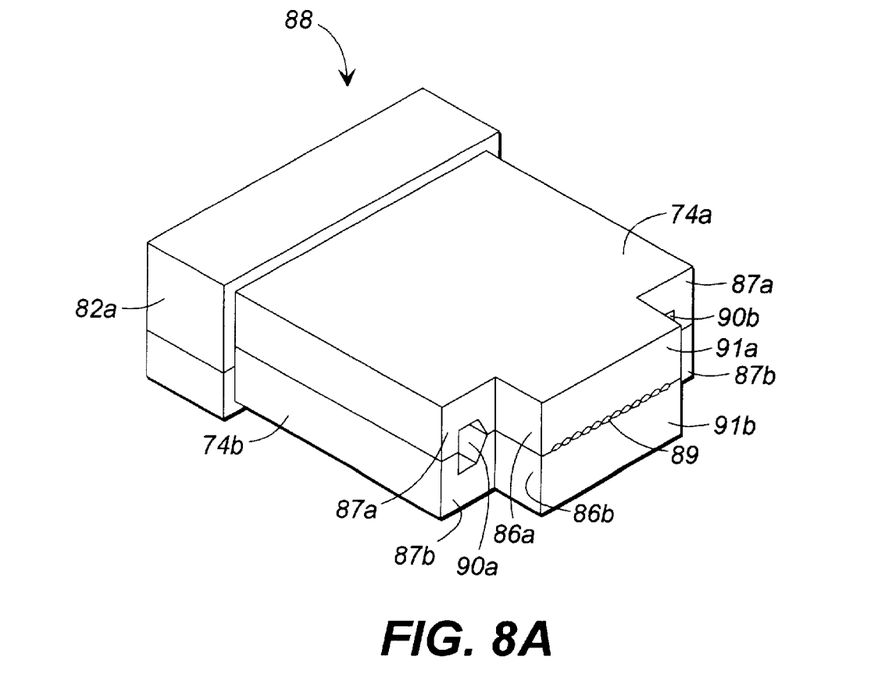
FIG. 8A is a perspective view of an assembled multi-fiber connector comprising two complementary members of the type shown in FIG. 7.

Referring now to FIG. 8A, an assembled connector 88 is shown to comprise a pair of mating connector members 74a,b secured to one another using an adhesive, weld, or other suitable securing means. Typically an adhesive will be used along the mating surfaces of members 74a,b as the adhesive serves to secure the cable and individual fibers (not shown) in connector 88 in addition to maintaining the connection between members 74a,b. It is important to note that in practice, a multi-fiber ribbon cable would first be assembled into one member 74 (i.e., the cable is received into region 80 and the fibers are broken out into grooves 76 such that they extend past the end of nose 86) before both members 74a,b are joined together to form connector 88. Alignment apertures 90a,b (see FIG. 10 for aperture 90b) are formed from alignment grooves 78a,b when connector members 74a,b are joined together. Those skilled in the art will appreciate the benefits of extending nose region 86a,b forward of alignment apertures 90a,b. Before connector 88 can be used, the end faces of the individual fibers held in channels 89 formed from grooves 76 must be polished. Thus, the entire end face 91a,b of connector 88 can be polished without involving apertures 90a,b in the process. This overcomes a common problem attendant to prior art connectors, such as the MTP/0 connector, in which debris generated from the polishing process tends to become lodged in alignment apertures because they are positioned flush with the fiber end faces.

Figure 6B:
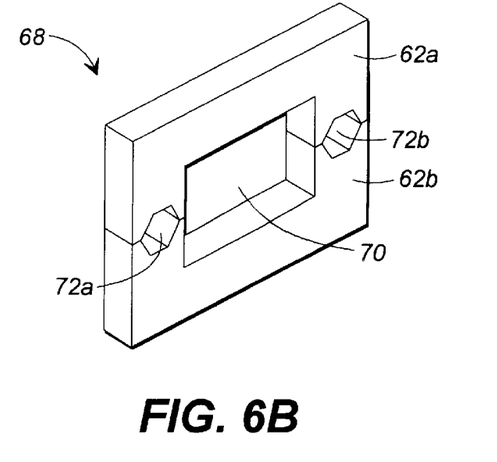
FIG. 6B is a perspective view of an assembled alignment adapter comprising two complementary members of the type shown in FIG. 5 and having hexagonal shaped alignment apertures.
Figure 8B:
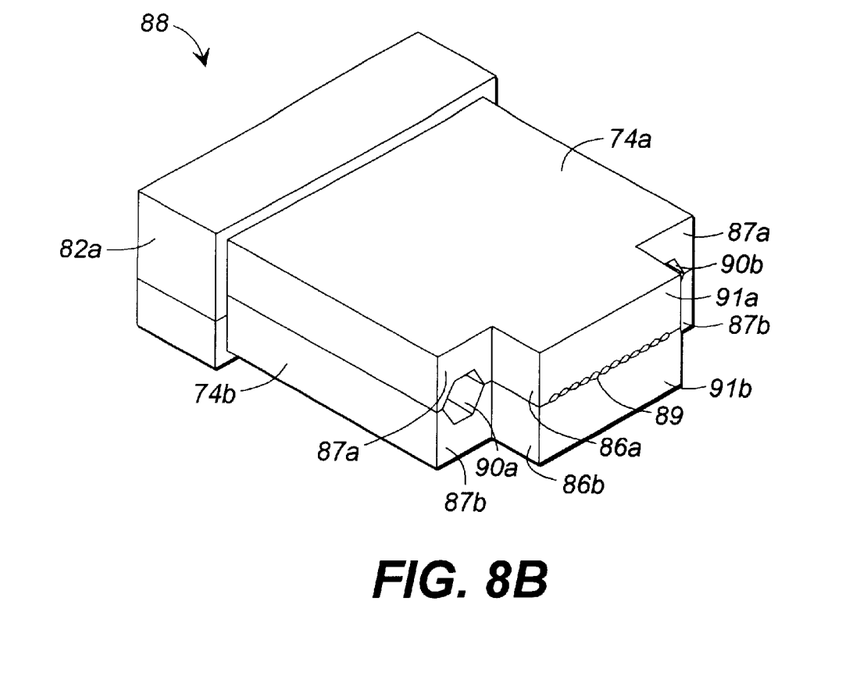
FIG. 8B is a perspective view of an assembled multi-fiber connector having hexagonal shaped alignment apertures consistent with the apertures formed in the alignment adapter of FIG. 6B

FIG. 8B depicts an alternative embodiment of connector 88 in which alignment apertures 90a,b are shown to take on a hexagonal shape consistent with the shape of alignment apertures 72a,b of alignment adapter 68 shown in FIG. 6B.

Figure 9:
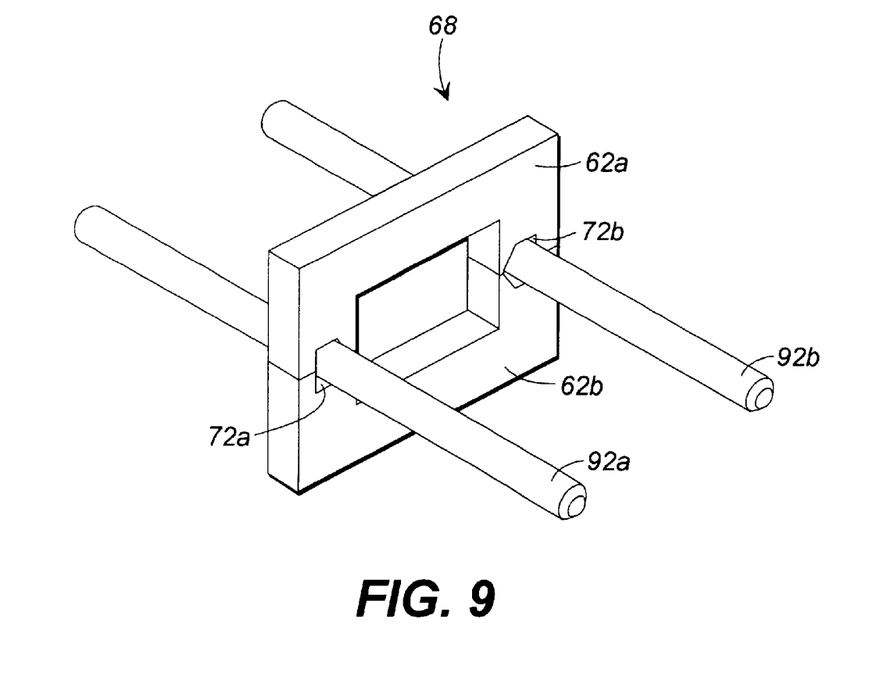
FIG. 9 is a perspective view of the alignment adapter of FIG. 6A with the alignment rods positioned therein.

FIG. 9 depicts alignment adapter 68 with alignment rods or pins 92a,b received in alignment apertures 72a,b. Preferably, adapter alignment grooves 66a,b (see FIG. 5) have an engagement mechanism incorporated in their design to frictionally engage alignment rods 92a,b such that they are securely held in adapter 68. Alternatively, adhesive can be used in alignment apertures 72a,b to hold rods 92a,b; however, this is less desirable as rods 92a,b cannot be easily removed and repositioned or replaced with alternatively styled rods. Alignment adapter 68 possesses sufficient thickness to hold alignment rods 92*a,b* normal to the plane defined adapter 68. Because of the natural symmetry of the assembly of FIG. 9, either ends of rods 92*a,b* can be inserted into alignment apertures 90*a,b* to convert connector 88 into a male type connector.

Figure 10:
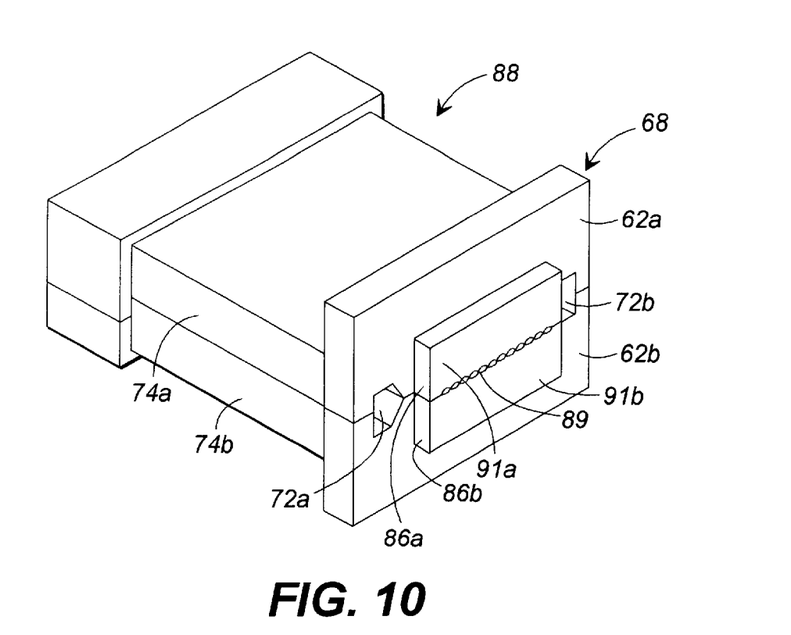
FIG. 10 is a perspective view of the multi-fiber connector of FIG. 8A with the alignment adapter positioned thereon.
Figure 11:
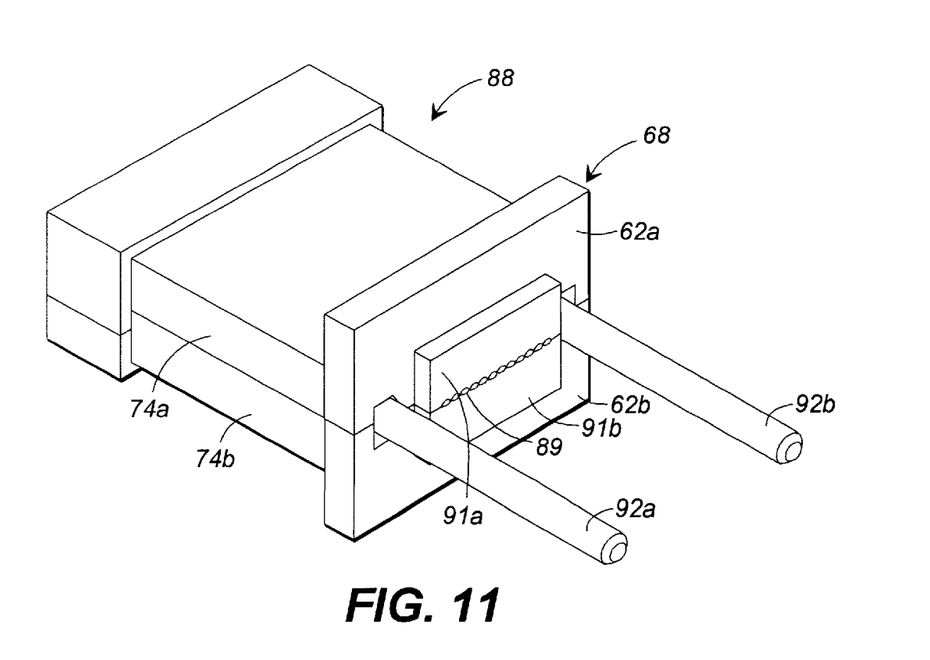
FIG. 11 is a perspective view of the connector/adapter assembly of FIG. 10 and additionally including the alignment rods of FIG. 9.

The interface between connector 88 and alignment adapter 68 is depicted in FIGS. 10 and 11. Nose 86*a,b* is received through aperture 70 until adapter 68 abuts against shoulders 87*a,b*. Because the constituent members of connector 88 and adapter 68 are each derived from replica 54 (see FIG. 4), as discussed in the foregoing, connector alignment apertures 90*a,b* register with exact precision with adapter alignment apertures 72*a,b*. Thus, alignment rods 92*a,b* need only be held through frictional engagement with adapter alignment grooves 66*a,b* (see FIG. 5), which form adapter alignment apertures 72*a,b*. Accordingly, the present invention obviates the need for lateral pressure to maintain the positioning of alignment rods or pins as practiced with some prior art connectors. The fit of alignment rods 92*a,b* inside connector alignment apertures 90*a,b* is merely snug. As a result, connector members 74*a,b* and alignment adapter members 62*a,b* are not susceptible to separation over time due to pressure from alignment rods 92*a,b*, which has plagued, for example, the MACII and the MP connectors. An outer shell (not shown) covering connector 88 and alignment adapter 68 is typically included to protect the assembly from environmental hazards.

Clearly, connector 88 and alignment adapter 68 pairs can be used to establish optical connections. For example, the male type connector assembly of FIG. 11 is joined to the female type connector of FIG. 10 through insertion of alignment rods 92*a,b* into alignment apertures 72*a,b* and apertures 90*a,b* underlying adapter 68 (see FIG. 8A) until the end faces 91*a,b* of the two connectors abut one another. Fiber channels 89 align with high precision because all of the individual components comprising the two connectors derive from a common replica 54 (see FIG. 4) and ultimately the same etched silicon template. Those skilled in the art will appreciate, however, that alternative connector designs can be duplicated in the etched silicon template, which allows the spatial geometry of the fiber grooves and the alignment grooves to be imparted to replica 54 and ultimately to the members comprising connector 88 and alignment adapter 68. Thus, connectors 88 and alignment adapters 68 can be produced that have fiber channels 89 and alignment apertures 72*a,b* that register precisely with the matching fiber and alignment channels of the MACII, MTP/0, and MP connectors of FIGS. 1–3. A particular advantage of mating a male type connector 88 and alignment adapter 68 with a MACII or MP female type connector (FIGS. 1 and 3 respectively), is that the alignment rods 92*a,b* will not exert lateral pressure on the bodies of the prior art connectors because of the precision with which the prior art connector dimensions can be duplicated in the present invention.

The connector and alignment adapter according to the present invention can be designed to mate with a variety of dissimilar connectors by precisely duplicating the spatial relationship of the fiber channels and alignment apertures of the dissimilar connector in the present connector and adapter. It is envisioned, however, that the present connector and alignment adapter could be mated to a dissimilar connector having a different spatial geometry with respect to the positional relationship between the alignment apertures and the fiber channels through precision bending and machining of the alignment pins or rods. According to this approach, the pins would be precisely bent such that the distance between the first ends of the two pins corresponds to the alignment apertures of the first connector and the distance between the second ends of the two pins corresponds to the alignment apertures of the second connector. This assumes, of course, the fiber channels of the two connectors are arranged identically.

The principles of the present invention have been illustrated herein as embodied in an alignment adapter for use with a multi-fiber connector. From the foregoing, it can readily be seen that the alignment adapter and connector provide a level of versatility not heretofore obtainable from prior art multi-fiber connectors. Specifically, the alignment adapter and connector pairs can be used to establish optical connections while avoiding the prior art problems of alignment rod pressure on the connector bodies or debris buildup in alignment apertures resulting from fiber end face polishing. Moreover, the alignment adapter and connector according to the present invention can be assembled in a male configuration to couple to prior art connectors, which, advantageously, also eliminates lateral pressure from alignment rods in those connectors susceptible to that problem. To achieve the aforementioned versatility, the present invention exploits the high precision silicon or monocrystalline etching techniques that have evolved in recent years. These techniques allow fiber and alignment channels to be defined with great precision while still compensating for the expected shrinkage when parts are eventually molded into plastic. From a high precision silicon template, an inverse replica can be made that is used to manufacture both the alignment adapter and connector according to the present invention. Thus, the precision with which the alignment adapter and connector are produced results in a correspondingly precise registration with similar or dissimilar connectors.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

I claim:

1. An alignment adapter for use with a multi-fiber optical connector, the multi-fiber optical connector being configured to receive fibers of an optical cable, the multi-fiber optical connector having a plurality of channels configured to hold the fibers of the cable and a first pair of apertures positioned in a defined spatial relationship with the channels, said alignment adapter comprising:

a substantially planar slab having a first member, a second member and a central opening for receiving the multi-fiber connector, said slab having alignment apertures on opposing sides of said central opening and positioned in a defined spatial relationship with the fibers held in the multi-fiber connector;

said first member having first alignment grooves formed at ends thereof;

said second member having second alignment grooves formed at ends thereof, said second member being matable with said first member such that, when mated thereto, said first and second alignment grooves meet to form said alignment apertures.

2. The alignment adapter of claim 1, further comprising: means for aligning said alignment apertures of said alignment adapter with the first pair of apertures of the connector.

3. The alignment adapter of claim 1, further comprising:
a pair of alignment rods disposed in said alignment apertures and having distal ends extending at least partially therefrom, said distal ends being adapted to be received within the first pair of apertures of the multi-fiber optical connector.

4. The alignment adapter of claim 1, wherein the connector and said alignment adapter are formed from a single template such that said alignment apertures of said alignment adapter precisely register with the first pair of apertures of the connector.

5. A connector assembly for terminating a multi-fiber optical cable, comprising:
a connector having a plurality of channels for holding the fibers from the cable and a first pair of apertures positioned in a defined spatial relationship with said channels; and
an alignment adapter having a first member, a second member, a central opening, and a second pair of apertures, said central opening for receiving said connector therethrough, said second pair of apertures being arranged on opposing sides of said central opening and positioned in a defined spatial relationship with said channels such that said second pair of apertures precisely register with said first pair of apertures,
said first member having first alignment grooves formed at ends thereof;
said second member having second alignment grooves formed at ends thereof, said second member being matable with said first member such that, when mated thereto, said first and second alignment grooves meet to form said second pair of apertures.

6. The connector assembly of claim 5, wherein said connector comprises:
a first member having a first plurality of grooves for receiving the fibers from the cable interposed between a first pair of alignment grooves; and
a second member having a second plurality of grooves for receiving the fibers from the cable interposed between a second pair of alignment grooves and secured to said first member such that said first and second plurality of grooves meet to form said channels and said first and second pair of alignment grooves meet to form said first pair of apertures.

7. The connector assembly of claim 5, wherein said connector further includes a nose region that is received through said central opening and extends said plurality of channels forward of said first pair of apertures.

8. The connector assembly of claim 5, further comprising:
means for aligning said first pair of apertures with said second pair of apertures.

9. The connector assembly of claim 5, further comprising:
a pair of alignment rods disposed in said first and second pair of apertures.

10. A method for manufacturing an alignment adapter for use with a multi-fiber optical connector, the connector having a first pair of alignment apertures formed therein, said method comprising the steps of:
etching a monocrystalline material with a plurality of parallel fiber grooves and a pair of alignment grooves to form a template, said fiber grooves being interposed between said pair of parallel alignment grooves;
creating an inverse replica from said template;
separating said inverse replica from said template;
using said inverse replica as a pattern for making alignment adapter members, each of said alignment members having alignment grooves formed at ends thereof; and securing a pair of alignment adapter members to one another to make the alignment adapter such that said alignment grooves of said pair of adapter members meet to form a second pair of alignment apertures, second pair of alignment apertures being configured to align with the first pair of alignment apertures formed in the connector.

11. The method of claim 10, further comprising the step of:
disposing a pair of alignment rods in said second pair of alignment apertures.

12. The method of claim 10, further comprising the following step prior to said using step:
machining said inverse replica to conform to the shape of the optical connector.

13. The method of claim 10, wherein said monocrystalline material is silicon.

14. The method of claim 10, wherein said inverse replica comprises nickel.

15. The method of claim 10, wherein said inverse replica is created through electroplating.

16. The method of claim 10, wherein said inverse replica is created through chemical vapor deposition.

17. The method of claim 10, wherein said inverse replica is created through electroless plating.

18. A method for the manufacture of a connector assembly for terminating a multi-fiber optical cable comprising an alignment adapter and a connector, comprising the steps of:
etching a monocrystalline material with a plurality of parallel fiber grooves and a pair of alignment grooves to form a template, said fiber grooves being interposed between said pair of parallel alignment grooves;
creating an inverse replica from said template;
separating said inverse replica from said template;
dividing said replica into a first and a second part;
using said first part as a first pattern for making alignment adapter members;
using said second part as a second pattern for making connector members;
securing a pair of alignment adapter members to one another to make the alignment adapter, said alignment grooves in said adapter members meeting to form a first pair of apertures;
securing a pair of connector members together to make the connector, said alignment grooves in said connector members meeting to form a second pair of apertures; and
receiving the alignment adapter on the connector at an end distal from the optical cable such that said first pair of apertures precisely registers with said second pair of apertures.

19. The method of claim 18, wherein said monocrystalline material is silicon.

20. The method of claim 18, wherein said inverse replica comprises nickel.

21. The method of claim 18, wherein said inverse replica is created through electroplating.

22. The method of claim 18, wherein said inverse replica is created through chemical vapor deposition.

23. The method of claim 18, wherein said inverse replica is created through electroless plating.

* * * * *